March 7, 1961 A. W. VIBBER Re. 24,945

METHOD OF AND APPARATUS FOR PLYING STRANDS

Original Filed Nov. 17, 1954 4 Sheets-Sheet 1

INVENTOR.
Alfred W. Vibber

METHOD OF AND APPARATUS FOR PLYING STRANDS
Original Filed Nov. 17, 1954 4 Sheets-Sheet 2
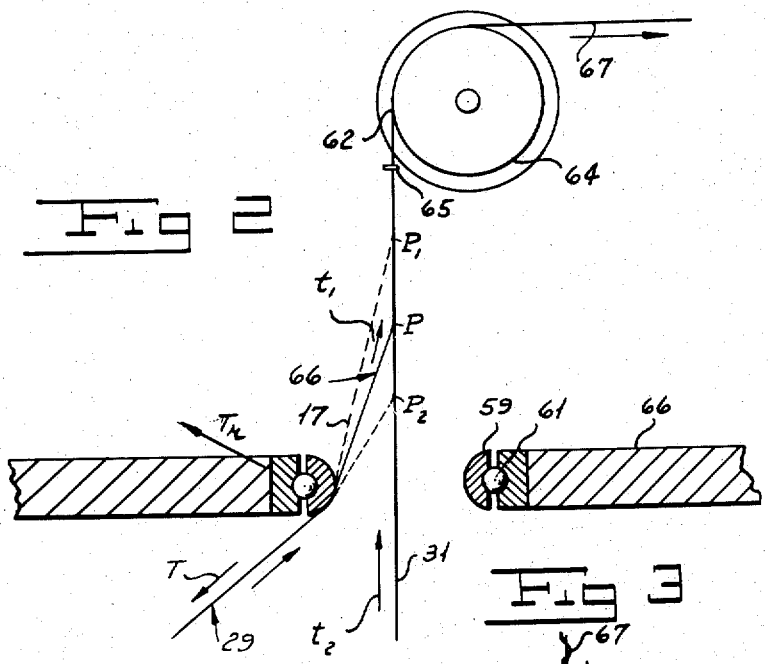
Fig 2
Fig 3
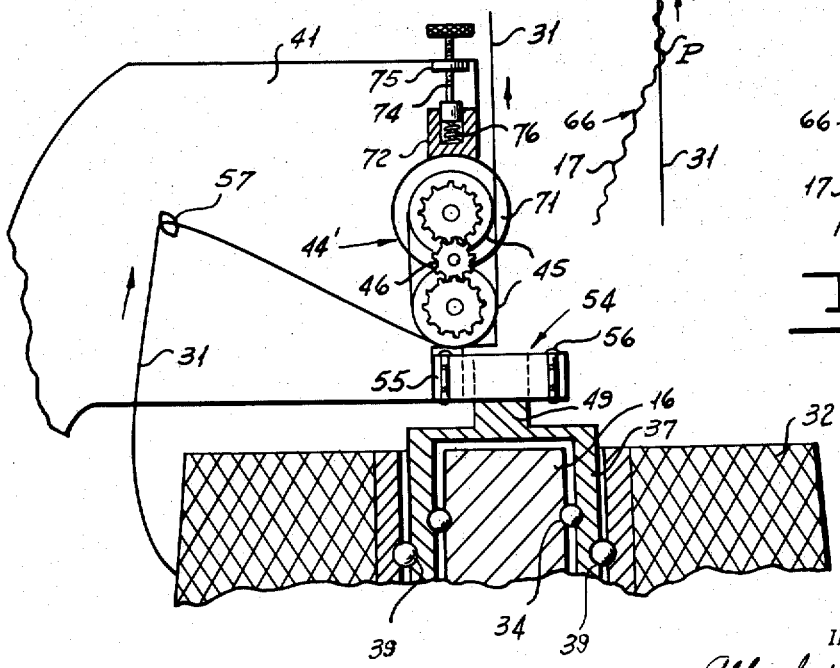
Fig 5
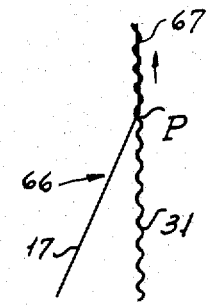
Fig 4
INVENTOR.
Alfred W. Vibber

METHOD OF AND APPARATUS FOR PLYING STRANDS

Original Filed Nov. 17, 1954 4 Sheets-Sheet 3

INVENTOR.
Alfred W. Vibber

METHOD OF AND APPARATUS FOR PLYING STRANDS

Original Filed Nov. 17, 1954 4 Sheets-Sheet 4

INVENTOR
Alfred W. Vibber

United States Patent Office

Re. 24,945
Reissued Mar. 7, 1961

24,945

METHOD OF AND APPARATUS FOR PLYING STRANDS

Alfred W. Vibber, 116 Pinehurst Ave., New York, N.Y.

Original No. 2,869,313, dated Jan. 20, 1959, Ser. No. 469,481, Nov. 17, 1954. Application for reissue Feb. 18, 1960, Ser. No. 9,662

19 Claims. (Cl. 57—58.3)

Matter enclosed in heavy brackets [ ] appears in the original patent but forms no part of this reissue specification; matter printed in italics indicates the additions made by reissue.

This invention relates to a method of and an apparatus for plying strands together to form cords.

More particularly, the invention relates to the twisting of two strands together so as to form a two-ply strand by ballooning a first strand delivered from a first let-off strand package about a second let-off strand package from which is fed a second strand. In prior apparatus of this type the first strand is withdrawn from the balloon inwardly through the balloon-creating shaft of flyer, and is plied wth the second strand at a zone generally within such shaft or flyer, the resulting cord or two-ply strand being withdrawn from the plying point or zone under tension.

Such prior apparatus has inherent difficulties in its control of the size of the balloon and of the uniformity of twist of the two strands, even if the first strand is fed into the balloon from a substantially positive constant speed strand-feeding means and the second strand is fed from its package and toward the plying point by a similar substantially constant speed strand-feeding means, because of the inherent creep of the strands at their respective feeding means. Apparatus of this type is practical, however, when provided with strand-feeding means such as shown and claimed in my prior application Serial No. 333,242 now U.S. Patent No. 2,731,785, or with automatic tension compensating devices such as shown and claimed in my prior applications Serial Nos. 361,999 now U.S. Patent No. Re. 24,380; 450,358 now U.S. Patent No. 2,814,925; and my application Serial No. 467,702, filed November 9, 1954, now U.S. Patent No. 2,727,353.

The method and apparatus of the present invention also balloons a first strand, from a first let-off package, about a second let-off package, and plies the two strands together adjacent an end of the balloon. In the present invention, however, the plying takes place adjacent the apex end of the balloon rather than at the flyer or balloon generating shaft. As a result, the construction and maintenance of the apparatus are simpler, and the size of the balloon is more easily controlled. Further, the symmetry of the twisted two-ply cord is more easily maintained, and the plying of the strands takes place under lower tension than it does with prior apparatus with the exception of the apparatus of certain of my above prior applications wherein strand feeding means in the flyer or balloon generating shaft equalizes the tension and rate of travel of the two strands toward the plying point.

Among the objects of my invention are the provision of strand plying apparatus of the type indicated wherein plying of the strands takes place adjacent the apex of the balloon; the provision in apparatus of the type discussed immediately above in this sentence of means reducing the tension of the strand leaving the balloon and approaching the plying point or zone so that plying of the strands takes place under relatively low tension; the provision of means reducing the tension of the run of the strand leaving the balloon and approaching the point of plying which automatically increases the tension in such run when the balloon increases in diameter and decreases the tension in such run when the balloon decreases in diameter; and the provision, in one preferred embodiment of the apparatus, of a simple, flyer or balloon generating shaft-incorporated automatic tensioning device for the strand in the balloon proper, whereby to maintain the balloon of essentially constant size.

A further object of the invention includes the provision of methods of carrying out the plying operation in accordance with the invention.

The above and further objects relating to economies of construction and operation of the apparatus of the invention and economies and the improved product resulting from practice of the method of the invention will appear from the following description of preferred embodiments of the apparatus and method.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Fig. 2 is a schematic view of the two strands at the plying zone illustrating the action of the balloon-compressing means adjacent the apex of the balloon.

Fig. 3 is a schematic view of the two strands at the plying point illustrating their interaction when the run of the ballooned strand immediately approaching the plying point is subjected to less tension than the other strand.

Fig. 4 is a schematic view of the two strands at the plying point illustrating their interaction when the run of the ballooned strand immediately approaching the plying point is subjected to more tension than the other strand.

Fig. 5 is a fragmentary view generally in axial section through the top portion of a modified spindle in which the strand feeding means for the package within the balloon is of the idle, retarded type.

Figure 1:
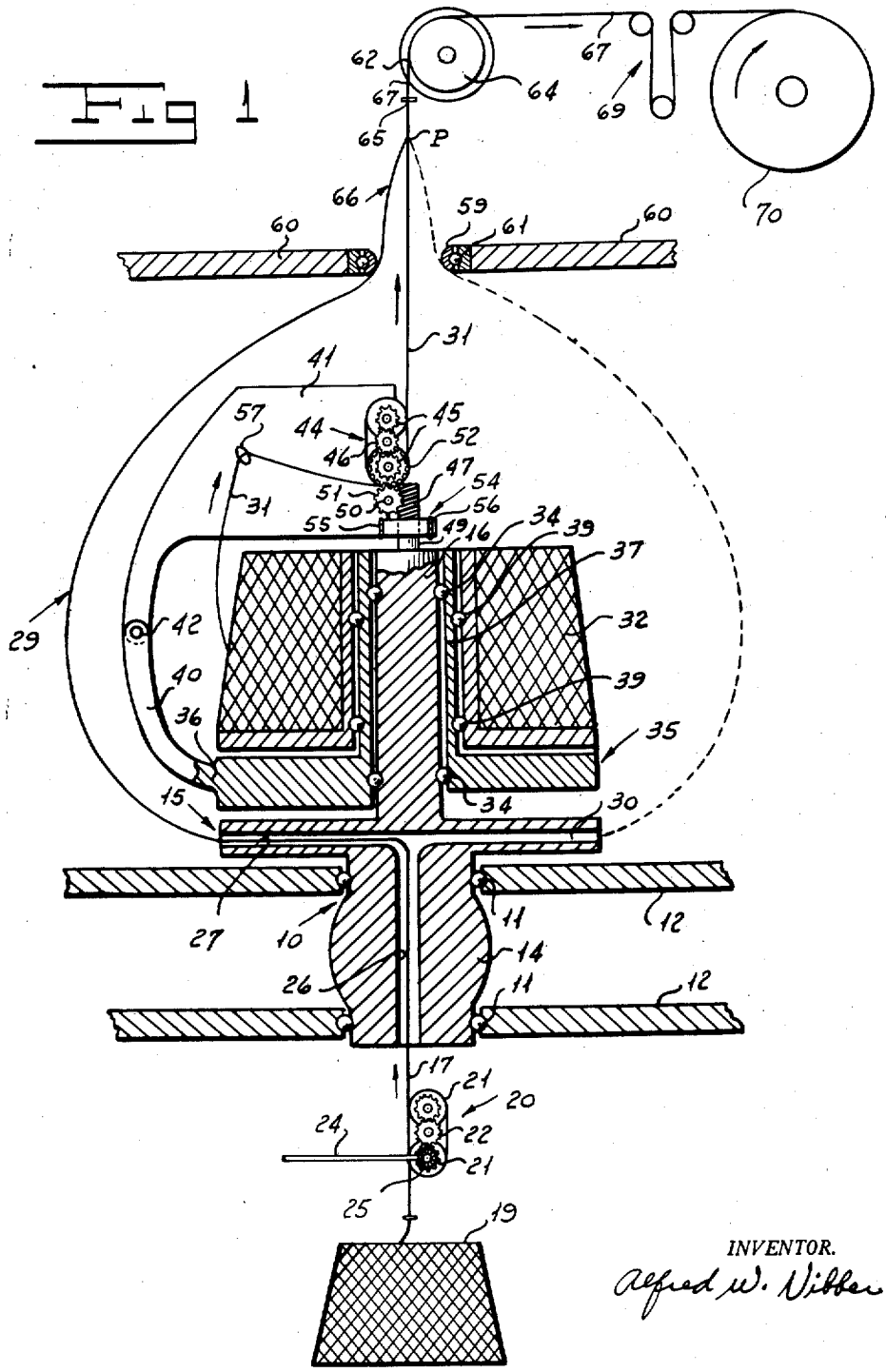
Fig. 1 is a somewhat diagrammatic view in axial section through the spindle of a first embodiment of the plying apparatus of the invention.

The first preferred embodiment of the strand plying apparatus of the invention is shown in Fig. 1. In such apparatus a rotary driven shaft generally designated 10 is mounted on bearings 11 supported in frame parts 12. Shaft 10 is driven at a high speed by a belt (not shown) engaging the crowned portion 14 of the shaft between the frame parts. Above the upper frame part 12 shaft 10 is provided with an enlarged flange portion or flyer 15 which functions as a balloon generating means. Above the flyer 15 shaft 10 is provided with the upper extension 16.

The first strand 17, to be ballooned by the spindle, is fed upwardly from the first package 19 by the driven constant speed strand feeding means 20. Means 20 consists of two multi-grooved capstans 21 geared together by intermediate idler gear 22 and driven at a constant speed by the shaft 24 connected to a driving means (not shown) synchronized in speed with the rotation of the shaft 10. Shaft 24 drives means 20 through the medium of the bevel gear 25.

Strand 17, after leaving means 20, progresses upwardly into the axial bore 26 of shaft 10 and thence radially through the connecting bore 27 in the flyer so as to be formed into the free flying loop or balloon 29 about the axis of shaft 10. To insure dynamic balance of the shaft the flyer is provided with an inactive or dummy passage 30 opposite passage 27. The strand 17 travels upwardly through the balloon toward the apex of the balloon, in the vicinity of which it meets a second strand 31 fed upwardly from the second strand package 32 within the balloon. As a result of the rotation of the strand in the balloon 29 about the run of the strand 31 the two strands are plied together. Because the apparatus imposes only a momentary false twist in the strand 17 the two strands in the plied cord are given no twist additional to that which they had in their packages.

Mounted on the extension 16 of the shaft 10 through the medium of the bearings 34 is the platform 35. Platform 35 is eccentrically weighted on one side, as shown as 36, so that when the shaft 10 is tilted at a small angle to the vertical, in its operative position, the platform 35 remains substantially non-rotating. The package 32 is mounted on the sleeve 37 integral with the platform 35 by means of the bearings 39 so as to be able to turn slowly about its axis as required by the paying off of the strand 31 therefrom.

The platform 35, at the location of the eccentric weight 36, is provided with an extension arm 40 which rises generally vertically from the edge of the platform. Arm 40 serves as the support for the frame member 41 which is hingedly connected thereto at 42. Carried on frame member 41 is the second constant speed driven capstan means 44 which comprises the two multi-grooved capstans 45 geared together by the intermediate idle gear 46, the central grooves of the capstans 45 lying along the axis of the shaft 10. Strand feeding means 44 is driven through the medium of the worm 47 positioned at the upper end of the reduced diameter extension 49 on shaft portion 16, the worm meshing with an hour-glass worm gear 50 having pinions 51 on the ends thereof meshing with the gears 52 on the ends of the lower capstan member 45. With the proper choice of pitch and hand of the worm 47 and worm gear 50 and with the proper choice of pitch diameters of gears 51 and 52, the capstans 45 will have the same direction and speed of peripheral travel as the capstans 21 of the first feeding means 20.

The frame member 41, which is pivotable counterclockwise about the means 42 to allow the replacement of the package 32, is accurately held in position so that worm gear 50 meshes with worm 47 by means of the split bearing 54 mounted on the inner lower edge of frame member 41. Bearing 54 has its two halves hinged to the frame as at 55, the two bearing halves being held in position to embrace shaft portion 49, when the frame is in operative position, by the removable pin 56 holding the outer ends of the bearing halves together.

The second strand 31, fed upwardly from package 32, passes through the eye 57 on the frame part 41 and into a radially outer groove on the lower capstan 45. The strand then progresses radially inwardly from groove to groove on the capstans until it reaches the center groove from which it then rises toward the plying point P, and generally axially through the balloon compressing member 59 as indicated in Fig. 1.

The balloon compressing member 59 is in this instance an annular member having a bore therethrough smoothly rounded in section, member 59 being mounted on frame member 60 through the medium of ball bearing 61 so as to rotate freely with the balloon. Such arrangement markedly decreases the friction imposed on the strand of the balloon by the strand compressing means. In some instances, however, the annular balloon compressing member may be fixed from rotation.

The member 59 which, as shown, is positioned in a plane parallel to the flyer 15 and coaxial thereof, compresses or constricts the balloon markedly inwardly from the position which the balloon otherwise would have in the absence of the strand 31 and the absence of the balloon compressing member. If neither the strand nor member 59 were present, the balloon would have its apex at the point 62 on the cord-guiding roller 64 positioned above and tangential to the axis of the balloon, or more properly, at the small eye 65, preferably employed, and positioned coaxial of the balloon a short distance below the point 62 thereon to facilitate guiding of the plied cord to the roller. The balloon compressing member 59, as will appear, has the functions of markedly decreasing the tension at the portion 66 of the balloon above member 59, thereby allowing the two strands to be plied together under reduced tension, of automatically confining the location of the plying point P to a relatively narrow range between the member 59 and the eye 65, and of automatically varying the rate of absorption of the strand from the balloon into the plied cord to maintain the balloon within desired operative diameters.

The plied cord 67, after rising through the eye 65, passes around the idle guiding roller 64 into the automatic cord tension controlling means 69 from which it is fed under substantially constant tension onto the take-up bobbin 70. The tension controlling means 69 may be of a conventional type, such as that shown in the patent to Clarkson No. 2,503,242.

The action of the balloon compressing means 59 to decrease the tension in the run of strand 17 in run 66 approaching the plying point markedly below that exerted on the strand in the balloon 29 proper below means 59 will be more apparent from a consideration of Fig. 2. In that figure, for clarity of illustration, the run 66 is shown as a straight line extending from means 59 to the plying point P. As evident from Fig. 2, the deflection by means 59 of the strand 17 from its normal balloon shape imposes a generally radially inward thrust on the strand, which is opposed by an equal reaction $T_r$ on the balloon compressing means 59. The tension T on the strand 17 in the balloon is thus opposed by a force which has forces $T_r$ and $t_1$ (the tension on run 66) as its components. Since the force $T_r$ is appreciable, the force or tension $t_1$ is markedly less than the tension T. The tension on the cord 67, when strands 17 and 31 are being symmetrically plied to form it, is divided equally between strands 17 and 31. Thus under such condition, each of strands 17 and 31 is subjected to a relatively low tension when being plied together, a tension which is markedly lower than that in balloon 29. Such low tension plying is desirable since it prevents one strand from taking a set about the other, and from unduly frictionally binding upon the other. Since the strands are resilient to some extent, and acquire a permanent stretch only after an appreciable time under tension, the relatively short time which strand 17 is under increased tension in balloon 29 does not alter its properties noticeably. Thus strand 17 in run 66 is in substantially the same condition as strand 31 as the two strands approach the plying point.

The balloon compressing means 59 maintains the position of the plying point in a relatively narrow range between a lower terminus somewhat above means 59 and an upper terminus not only below the normal apex 62 but also well below the eye 65. Fig. 2 shows the position of the plying point P, when the run 66 of strand 17 occupies a medial position in such range. The upper position, $P_1$, and the lower position, $P_2$, show upper and lower termini of the range of travel of the plying point in a typical plying operation conducted with the apparatus of Fig. 1. As the plying point descends the tension in run 66 of strand 17 increases, because of the lessened side thrust on the strand by means 59, and as the plying point rises, the tension in run 66 decreases.

When the tension in a first one of two strands, being plied together by being brought together generally radially and twisted about each other, is less than that in the other strand, the first strand tends to wrap around the other, second strand as a core. As a result, under such condition, more of the first strand than of the second strand is absorbed into the plied cord. The converse result of course occurs when the tension in the second strand is less than that of the first when they are plied together. Such conditions are schematically illustrated, respectively, in Figs. 3 and 4. In Fig. 3 the tension in the run 66 of the first strand 17 is depicted as being less than that in the second strand 31; in Fig. 4 the tension in the run 66 of strand 17 exceeds that in strand 31.

Assume that the tension conditions of Fig. 3 exist, and that the plying point momentarily occupies the medial position P, as shown. Thereupon, strand 17 will be absorbed into cord 67 at an increased rate until the plying point descends sufficiently toward position $P_2$ to increase the tension in run 66 of strand 17 to a value such that the tensions in the two strands become equal. Next assume that the tension conditions of Fig. 4 exist, and that the plying point momentarily occupies the medial position P, as shown. Thereupon, strand 17 will be absorbed into cord 67 at a decreased rate until the plying point rises sufficiently toward position $P_1$ to decrease the tension in run 66 of strand 17 to a value such that the tensions in the two strands become equal. Although for purposes of illustration the range of travel of the plying point is shown as relatively extended, in the operation of the device it is usually rather small, so that the two strands are absorbed into the plied cord at a substantially uniform rate and the resulting cord is characterized by its symmetry.

The apparatus of Fig. 1 also functions to maintain the ballon within a predetermined operative range of diameters. The strand feeding means 20 and 44 tend to feed their strands 17 and 31 into the ballon 29 and toward the plying point, respectively, at constant speeds. Due to the inherent creep of the strands at the feeding means, however, no absolutely accurate length for length feeding of the two strands can be achieved. Variations in the feeding of the strands cannot become cumulative in the present apparatus as in prior apparatus of the type wherein balloon size variations were uncorrected and an increase in the balloon diameter increased the tension in the run of the strand emerging from the ballon and approaching the plying point. As evident from the above explnation of the manner of operation of the present device, an increase in the diameter of the balloon results in the decrease in the tension in run 66 of strand 17, thereby increasing the rate of absorption of the strand 17 into the plied cord. Thereupon the balloon 29 is reduced in diameter to its optimum, medial diameter at which the tension of the strand 17 in run 66 is of such value as to equal that in strand 31 approaching the plying point. The converse action occurs when balloon 29 decreases in diameter appreciably beyond its optimum, medial value.

Figure 6:
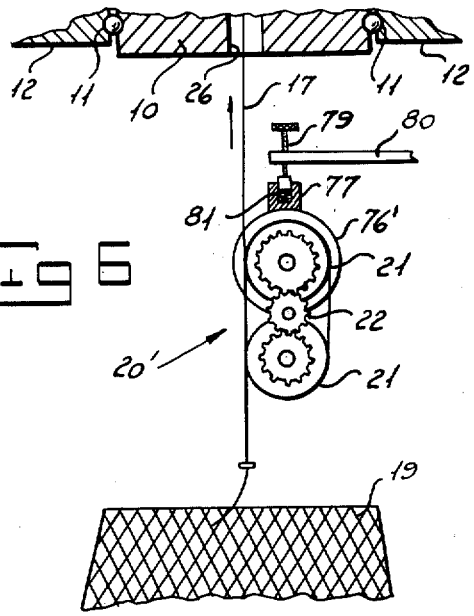
Fig. 6 is a fragmentary view in section taken generally along the axis of the spindle, illustrating a modified means for feeding the strand from the lower package into the balloon, certain parts of such feeding mechanism being shown in elevation.
Figure 7:
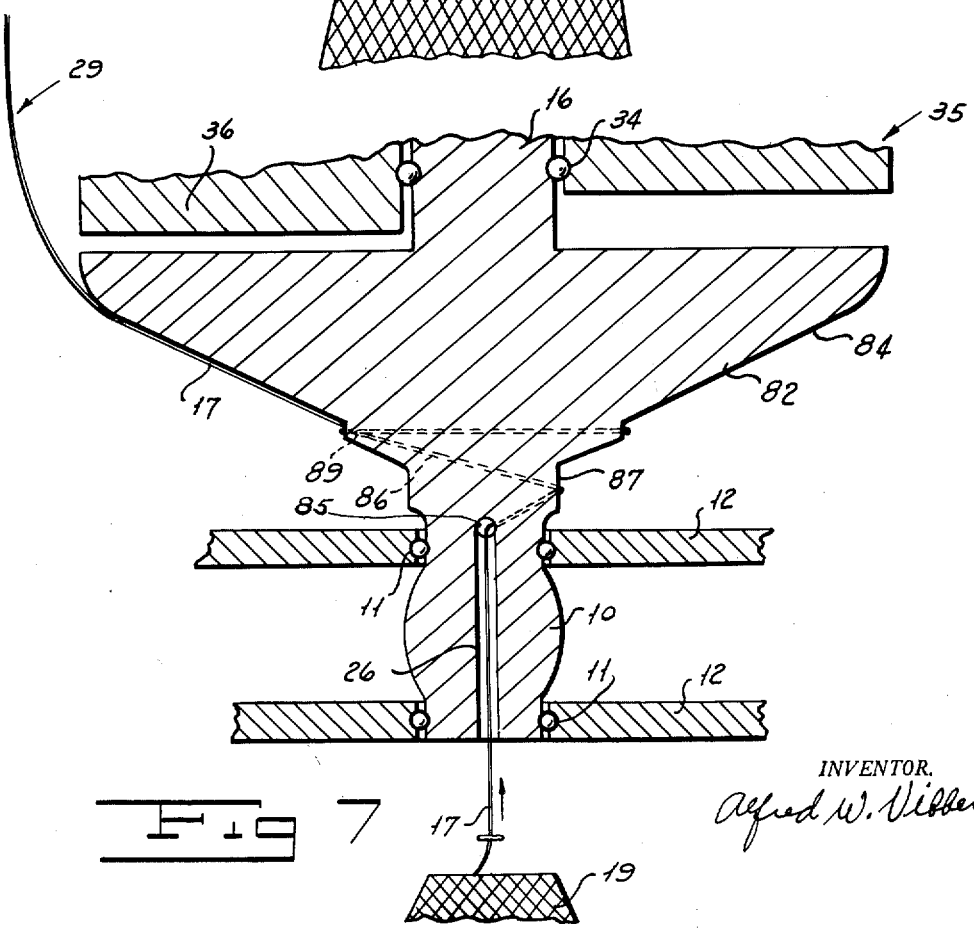
Fig. 7 is a view in vertical section through the lower end of a still further modified spindle wherein an automatic tensioning device for the strand in the balloon is provided on the flyer or balloon generating shaft of the spindle.

The apparatus of Fig. 1 may be modified in various manners, if desired. In Fig. 5 there is shown the first of the illustrated modifications. Other modifications are shown in Figs. 6 and 7. The same reference characters are employed in Figs. 5, 6 and 7 to designate the same parts as shown in Fig. 1. Somewhat altered parts are designated by the same characters as in Fig. 1 with an added prime.

Fig. 5 shows a frictional retarded feeding means 44' for strand 31 from package 32 which replaces the positively driven, constant speed strand feeding means 44 in the first illustrated modification of the apparatus of Fig. 1. Means 44' comprises the two multi-grooved capstans 45 journalled on frame member 41, such capstans being geared together by the idle intermediate gear 46. Rather than being positively driven, however, capstans 45 in Fig. 5 are driven by the passage of strand 31 over and around them, and are frictionally retarded by the interaction of the brake drum 71 mounted on the upper capstan and the brake shoe 72, which is urged into contact with the drum by the screw 74 threaded in support 75 on frame member 41, and acting upon the brake shoe through compression spring 76. Means 44' accordingly omits the worm 47, the worm gear 50, and the bevel gears 51 and 52 of means 44 of Fig. 1.

In such first modification of the apparatus the strand 17, as in Fig. 1, is fed into its balloon at a substantially constant speed by positive, driven feeding means such as means 20. The only large variable capable of markedly affecting balloon size is therefore the rate of absorption of the first strand, 17, into the plied cord. The screw 74 of means 44' is adjusted to cause means 44' to impose upon strand 31 a sufficient retardation so that strand 31 has a tension equal to one-half that in plied cord 67 and equal to that in run 66 of strand 17 when the plying point is positioned at a medial point in the operative range of travel of the plying point. *The means 44' imposes a predetermined substantially constant tension upon the strand 31 delivered therefrom for each adjusted position of screw 74.*

Fig. 6 shows a fragment of a second modified apparatus in accordance with the invention. Such second modified embodiment is the same as that shown in Fig. 1 with the exception that for the positive, constant speed means 20 for forwarding strand 17 into the balloon there is substituted the frictionally retarded feeding means 20' of Fig. 6. In this embodiment, strand 31, as in Fig. 1, is fed toward the plying point by constant speed means 44. Such feeding means 20' has multi-grooved capstans 21 intergeared by intermediate gear 22. The capstan driving means 24, 25 of Fig. 1 are omitted, however, and the capstans of Fig. 6 are frictionally retarded by the drum 76', affixed to the upper capstan, and the brake shoe 77 urged thereagainst by the screw 79 threaded through a frame part 80 and acting upon the brake shoe through the medium of compression spring 81. Screw 79 is adjusted so that the tension on the strand 17 is sufficient to maintain its balloon of optimum diameter. The balloon compressing member 59 then acts to maintain the balloon of constant diameter by appropriate variation in the location of the plying point.

A further modified embodiment of the apparatus of the invention employs, in a combination such as shown in Fig. 1, the lower, frictionally retarded, feeding means 20' of Fig. 6 for strand 17 from package 19, and the upper, frictionally retarded, feeding means 44' of Fig. 5 for strand 31 from package 32. Such feeding means are both adjusted so that when the plying point is at a medial height and the balloon is of a medial diameter the tensions in strands 17 and 31 are equal. The balloon compressing member 59 functions, in this embodiment, to vary the position of the plying point in its operative range of travel in such manner as to tend to maintain the tensions in the runs of the two strands approaching the plying point equal at all times, and thus to maintain the diameter of the balloon within narrow, desired limits.

In Fig. 7 there is shown a still further modified means for feeding strand 17 into balloon 29. The strand feeding means of Fig. 7 may be employed to replace that shown in Fig. 1 in the general combination of Fig. 1 wherein strand 31 is fed toward the plying point by positively driven, constant speed means 44, or in the general combination of Fig. 1 further modified, in addition to the substitution therein of the means of Fig. 7 for feeding strand 17, by the use of the frictionally retarded strand feeding means of Fig. 5 for the means 44 of Fig. 1 for feeding strand 31 toward the plying point.

In Fig. 7, the shaft 10 is rotatably supported, as before, on the bearings 11 on frame members 12. The strand 17, in this instance, is fed directly from package 19 upwardly into bore 26 in the shaft 10. The flyer 82, formed, as before, as an enlarged head on shaft 10, has a generally upwardly dished surface 84. The upper end of axial bore 26 in shaft 10 communicates with a generally radial passage through which the strand 17 passes outwardly in the run 86 which is usually wrapped somewhat less than one turn about the generally circular cylindrical surface 87 of the shaft immediately above passage 85. From surface 87 the strand 17 passes upwardly to the strand storage annular generally circular cylindrical surface or "wheel" 89 about which it is wrapped for a variable number of turns and from which it passes upwardly helically about the surface 84 of the flyer 82 into the balloon 29.

Surface 87, and particularly surface 89, function as an automatic tension regulating means acting upon the strand 17 in advance of its entry into balloon 29 to maintain the balloon of substantially constant diameter. The strand 17 is urged radially outwardly through passage 85 by centrifugal force as the shaft 10 rotates rapidly. Such action on the strand wrapped around the surfaces 87 and 89 of the flyer tends to loosen such wraps and to allow the strand 17 in them to travel more freely through the wraps into the balloon. The tension of the strand 17 in the balloon, however, constantly tends to tighten the wraps upon the surfaces 89 and 87, thus frictionally retarding travel of strand 17 into the balloon. The amount of such frictional retardation varies with the tension of the strand in the balloon and thus of the diameter of the balloon, since the tension of the strand in the balloon grows greater as balloon diameter increases. Therefore when the balloon increases in diameter the frictional retardation of strand 17 on surfaces 87 and 89 increases, and as the balloon decreases in diameter the frictional retardation of strand 17 on surfaces 87 and 89 decreases. The flyer 82 with its described surfaces 87 and 89, as a result, tends to maintain balloon 29 of constant diameter.

When the flyer structure of Fig. 7 is employed in the general combination of Fig. 1 to replace the means 20 to feed strand 17, shown in Fig. 1, as well as to replace the flyer shown in Fig. 1, the driven means 44 to feed strand 31 at a substantially constant speed being retained, the balloon compressing means 59 functions as before to maintain the tension in the runs of the strands 17 and 31 approaching the plying point substantially equal, the plying point location within its desired operative limits of travel, and the resulting cord substantially uniform as regards twist and symmetrical as regards the lengths of the two strands incorporated therein.

The flyer of Fig. 7 may also be employed in the general combination of Fig. 1, to replace the flyer there shown and also the strand feeding means 20, with the strand feeding means 44 of Fig. 1 replaced by the means 44' shown in Fig. 5, wherein the strand 31 is frictionally retarded in its travel toward the plying point. The balloon compressing means 59 acting on the balloon 29 generated and maintained by the flyer 82 acts, in this embodiment, as in the others herein described, to maintain the tensions in the two strands approaching the plying point substantially constant and to correct deviations in balloon diameter by aiding in the requisite variation of the rate of absorption of the strands into the plied cord to counteract such deviation.

Although the balloon compressing means 59 has been above described as being either fixed and non-rotatable, or as idle and freely rotatable, as shown in Figs. 1 and 2, such means if desired may be driven in the direction of rotation of the flyer, and thus of the strand in the balloon, in order to decraese friction imposed on the strand in the balloon. A convenient speed of drivingly rotating the means 59 is one equal to the speed of rotation of the flyer of the spindle, although if desired the annular balloon compressing member may be drivingly rotated about its axis at a speed somewhat exceeding that of the flyer.

Figure 8:
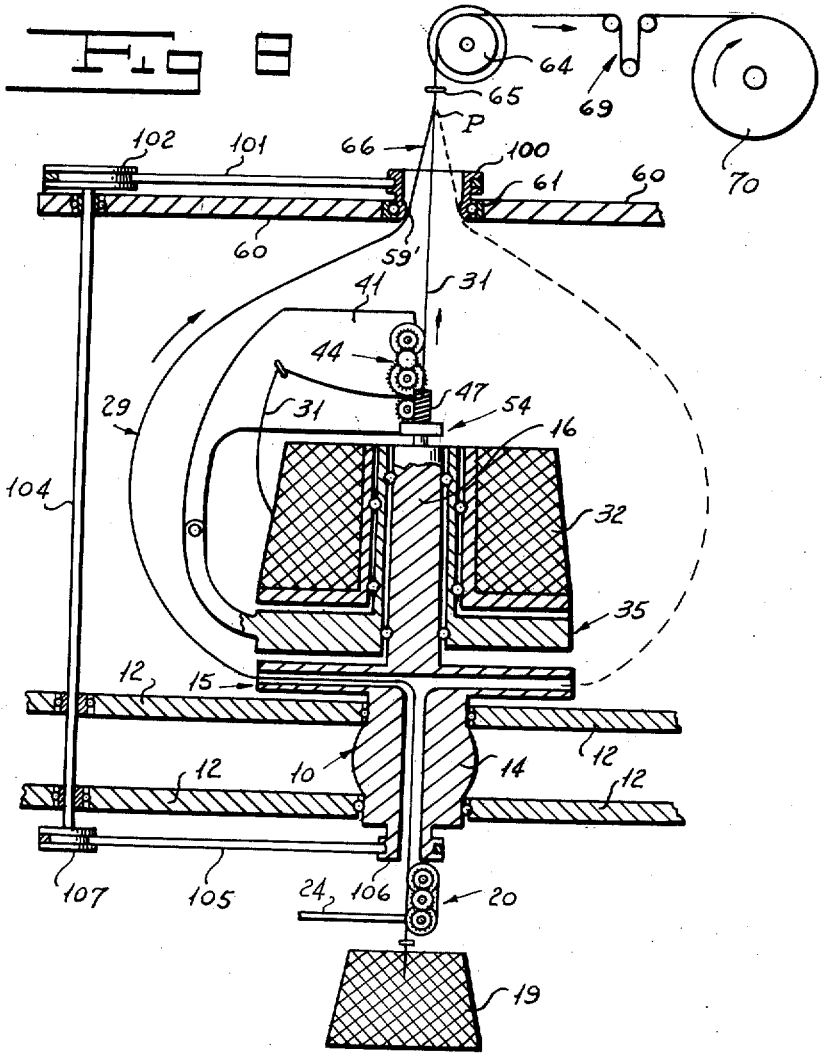
Fig. 8 is a view similar to Fig. 1 of a first modification of the device of Fig. 1 wherein the annular balloon compressing member is driven.
Figure 9:
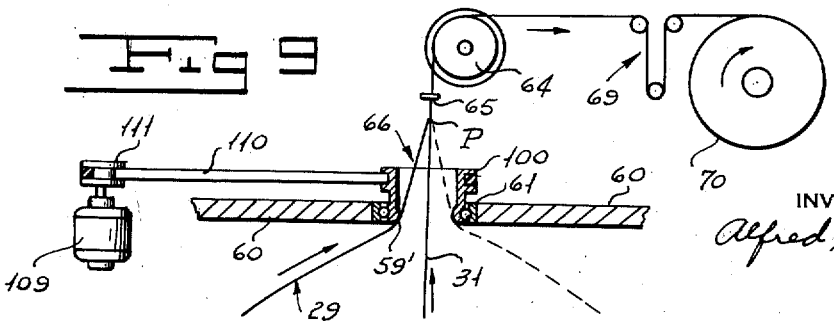
Fig. 9 is a fragmentary elevational view of a second modification of the device of Fig. 1 wherein the annular balloon compressing member is driven.

Two suitable means for driving the balloon compressing means are shown in Figs. 8 and 9, respectively. In both such figures the balloon compressing means is designated 59'.

In Fig. 8 the means 59' is shown as being driven by means of shafting and belting connecting it to the spindle shaft. In such embodiment, a pulley 100 extends from the upper end of member 59', and is drivingly engaged by belt 101 extending over a pulley 102 on shaft 104. Shaft 104 is driven by belt 105 entrained over pulley 106 on the bottom of the spindle shaft 10 and pulley 107 at the lower end of shaft 104.

In Fig. 9 the means 59' is driven by a separate synchronous motor. Such figure shows a synchronous electric motor 109 which drives annular balloon compressing member 59' by means of a belt 110 entrained over the pulley 111 on motor 109 and the pulley 100 which extends from the upper end of member 59' as in Fig. 8.

I claim:

1. The method of twisting together two strands to form a two-ply cord comprising: feeding a first strand in the direction of its length, rotating a portion of the first strand in the form of a free-flying balloon by a rotating shaft contacting the balloon at a first end thereof, forming the apex of the balloon at the opposite, second end thereof by a first guide member, inwardly compressing the balloon intermediate the apex and the shaft and near the apex by a second, annular, balloon guiding member, feeding a second strand under tension from a package located within the balloon of the first strand generally axially through the second balloon guiding member and into contact with the first strand at a plying zone located intermediate the apex of the balloon and the second balloon guiding member, and taking up the plied cord beyond the plying zone.

2. The method of twisting together two strands to form a two-ply cord comprising: feeding a first strand in the direction of its length, rotating a portion of the first strand in the form of a free-flying balloon by a rotating shaft contacting the balloon at a first end thereof, forming the apex of the balloon at the opposite, second end thereof by a first guide member, inwardly compressing the balloon intermediate the apex and the shaft and near the apex by a second, annular, balloon guiding member to form the part of the balloon at the second guiding member generally into a frustum of a cone of substantial apex angle, feeding a second strand under tension from a package located within the balloon of the first strand generally axially through the second balloon guiding member and into contact with the first strand at a plying zone located intermediate the apex of the balloon and the second balloon guiding member, and taking up the plied cord beyond the plying zone.

3. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and constricting the balloon near the apex and intermediate the apex and the shaft, a support carrying a let-off strand package for a second strand within the balloon, means for feeding the first strand through the balloon in the direction from the shaft to the apex of the balloon, means for feeding the second strand under tension from its package toward the apex of the balloon and generally axially through the annular balloon guiding means toward the apex of the balloon to contact the first strand at a plying zone located intermediate the apex of the balloon and the annular guiding means, and means for taking-up the plied cord.

4. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and constricting the balloon near the apex and intermediate the apex and the shaft, a support carrying a let-off strand package for a second strand within the balloon, means for feeding the first strand at constant speed into the end of the balloon engaged by the shaft, means for feeding the second strand at constant speed from its package toward the apex of the balloon and generally axially through the annular guiding means, and means beyond the apex of the balloon for taking-up the plied cord.

5. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and constricting the balloon near the apex and intermediate the apex and the shaft, a support carrying a let-off strand package for a second strand within the balloon, driven means for feeding the first strand at constant speed into the end of the balloon engaged by the shaft, driven means for feeding the second strand at constant speed from its package toward the apex of the balloon and generally axially through the annular guiding means, and means beyond the apex of the balloon for taking-up the plied cord.

6. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and markedly constricting the balloon near the apex and intermediate the apex and the shaft, a support carrying a let-off strand package for a second strand within the balloon, driven means for feeding the first strand at constant speed into the end of the balloon engaged by the shaft, driven means for feeding the second strand at constant speed from its package toward the apex of the balloon and generally axially through the annular guiding means toward the apex of the balloon to contact the first strand at a plying zone located intermediate the apex of the balloon and the annular guiding means, and means beyond the apex of the balloon for taking-up the plied cord.

7. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and constricting the balloon near the apex and intermediate the apex and the shaft, a support carrying a let-off strand package for a second strand within the balloon, means for feeding the first strand at constant speed into the end of the balloon engaged by the shaft and through the balloon to the apex thereof, means for feeding the second strand from its package toward the apex of the balloon and generally axially through the annular guiding means to a plying zone located between the annular guiding means and the apex guide for the balloon, said means for feeding the second strand including strand-tensioning retarding means engaging the second strand in its passage to the apex of the balloon, and means beyond the apex of the balloon for taking-up the plied cord.

8. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and markedly constricting the balloon near the apex and intermediate the apex and the shaft, a support carrying a let-off strand package for a second strand within the balloon, means for feeding the first strand into the end of the balloon engaged by the shaft and through the balloon to the apex thereof including strand-tensioning retarding means engaging the first strand, means for feeding the second strand from its package toward the apex of the balloon and through the annular guiding means, frictional retarding means engaging the second strand in its passage to the apex of the balloon, and means beyond the apex of the balloon for taking-up the plied cord.

9. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular guiding means receiving and markedly locally constricting the balloon near the apex and intermediate the apex and the shaft, a support carrying a let-off strand package for a second strand within the balloon, means for feeding the first strand into the end of the balloon engaged by the shaft and through the balloon to the apex thereof, frictional retarding means engaging the first strand in advance of its entry into the balloon, means for feeding the second strand at constant speed from its package toward the apex of the balloon and through the annular guiding means, and means beyond the apex of the balloon for taking-up the plied cord.

10. Apparatus for twisting together two strands to form a two-ply cord comprising: a source of supply of a first strand, a rotatable shaft operable to engage the first strand and to rotate it in the form of a balloon having an apex remote from the shaft, means for forming and guiding the apex of the balloon, annular rotatable guiding means receiving and markedly locally constricting the balloon near the apex and intermediate the apex and the shaft, a support carrying a let-off strand package for a second strand within the balloon, means for feeding the first strand at substantially constant speed into the end of the balloon engaged by the shaft and through the balloon to the apex thereof, means for feeding the second strand at substantially constant speed from its package toward the apex of the balloon and through the annular guiding means, and means beyond the apex of the balloon for taking-up the plied cord.

11. Apparatus for twisting together two strands to form a two-ply cord comprising: a source of supply of a first strand, a rotatable shaft engaging the strand and rotating it in the form of a balloon having an apex remote from the shaft, annular guiding means receiving and markedly locally constricting the balloon at a location near its apex but substantially spaced therefrom so that the strand in the zone from the guiding means to the apex of the balloon generates a generally cone-shaped figure of substantial apex angle, a support carrying a let-off strand package for a second strand within the balloon, means for feeding the first strand axially into the shaft, then into the end of the balloon engaged by the shaft, and then through the balloon in the direction from the shaft to the apex of the balloon, means for feeding the second strand from its package toward the apex of the balloon and through the annular guiding means substantially along the axis of such means whereby the two strands meet and are plied together in a zone located between the apex of the balloon and the annular balloon guiding means, and means beyond the apex of the balloon for taking-up the plied cord.

[12. Apparatus for twisting together two strands to form a two-ply cord comprising: a source of supply of a first strand, a rotatable shaft engaging the strand and rotating it in the form of a balloon, a strand storage and strand retarding surface on the outside of the shaft, a support carrying a let-off strand package for a second strand within the balloon, means for feeding the first strand axially into the shaft, then outwardly to the strand storage surface on the shaft, then into the end of the balloon engaged by the shaft, and finally through the balloon in the direction from the shaft to the opposite end of the balloon, means for feeding the second strand from its package toward such opposite end of the balloon whereby the two strands meet and are plied together at the opposite end of the balloon, and means beyond the opposite end of the balloon for guiding the plied cord.]

13. Apparatus for twisting together two strands to form a two-ply cord comprising: a source of supply of a first strand, a rotatable shaft engaging the strand and rotating it in the form of a balloon having an apex remote from the shaft, an annular strand storage and strand retarding surface on the outside of the shaft, annular guiding means receiving and markedly locally constricting the balloon at a location near its apex but substantially spaced therefrom, a support carrying a let-off strand package for a second strand within the balloon, means for feeding the first strand axially into the shaft, then outwardly to the strand storage surface on the shaft, then into the end of the balloon engaged by the shaft, and finally through the balloon in the direction from the shaft to the apex of the balloon, means for feeding the second strand under tension from its package toward the apex of the balloon and through the annular guiding means substantially along the axis of such means whereby the two strands meet and are plied together in a zone located between the apex of the balloon and the annular balloon guiding means, and means beyond the apex of the balloon for taking-up the plied cord.

14. Apparatus for twisting together two strands to form a two-ply cord comprising: a source of supply of a first strand, a rotatable shaft engaging the strand and rotating it in the form of a balloon having an apex remote from the shaft, annular guiding means receiving and markedly locally constricting the balloon at a location near its apex but substantially spaced therefrom so that the strand in the zone from the guiding means to the apex of the balloon generates a generally cone-shaped figure of substantial apex angle, a support carrying a let-off strand package for a second strand within the balloon, means for feeding the first strand axially into the shaft, then into the end of the balloon engaged by the shaft, and then through the balloon in the direction from the shaft to the apex of the balloon, means for feeding the second strand from its package toward the apex of the balloon and through the annular guiding means substantially along the axis of such means whereby the two strands meet and are plied together in a zone located between the apex of the balloon and the annular balloon guiding means, and means beyond the apex of the balloon for taking-up the plied cord, the means for feeding the first strand being so constructed and arranged as to feed said first strand at constant speed.

15. Apparatus for twisting together two strands to form a two-ply cord comprising: a source of supply of a first strand, a rotatable shaft engaging the strand and rotating it in the form of a balloon having an apex remote from the shaft, annular guiding means receiving and markedly locally constricting the balloon at a location near its apex but substantially spaced therefrom so that the strand in the zone from the guiding means to the apex of the balloon generates a generally cone-shaped figure of substantial apex angle, a support carrying a let-off strand package for a second strand within the balloon, means for feeding the first strand axially into the shaft, then into the end of the balloon engaged by the shaft, and then through the balloon in the direction from the shaft to the apex of the balloon, means for feeding the second strand from its package toward the apex of the balloon and through the annular guiding means substantially along the axis of such means whereby the two strands meet and are plied together in a zone located between the apex of the balloon and the annular balloon guiding means, and means beyond the apex of the balloon for taking-up the plied cord, the means for feeding the second strand being so constructed and arranged as to feed said second strand at a controlled variable speed.

16. Apparatus as defined in claim 15, wherein the means for feeding the first strand is so constructed and arranged as to feed said first strand at constant speed.

*17. Apparatus for twisting together two strands to form a two-ply cord comprising: a source of supply of a first strand, a rotatable shaft engaging the strand and rotating it in the form of a balloon, a support carrying a let-off strand package for a second strand within the balloon, a first means for feeding the first strand axially into a shaft, then outwardly and into the end of the balloon formed by the shaft, and finally through the balloon in the direction from the shaft to the opposite end of the balloon, a second means for feeding the second strand from its package toward such opposite end of the balloon whereby the two strands meet and are plied together at the opposite end of the balloon, and means beyond the opposite end of the balloon for guiding the plied cord, one of said first and second feeding means being positively driven at constant speed and feeding its strand therepast at substantially constant speed, and the other feeding means frictionally retarding its strand so that the said strand is delivered therefrom under a substantially constant predetermined tension.*

*18. Apparatus for twisting together two strands to form a two-ply cord comprising: a source of supply of a first strand, a rotatable shaft engaging the strand and rotating it in the form of a balloon, a support carrying a let-off strand package for a second strand within the balloon, a first means for feeding the first strand axially into a shaft, then outwardly and into the end of the balloon formed by the shaft, and finally through the balloon in the direction from the shaft to the opposite end of the balloon, a second means for feeding the second strand from its package toward such opposite end of the balloon whereby the two strands meet and are plied together at the opposite end of the balloon, and means beyond the opposite end of the balloon for guiding the plied cord, the first feeding means being positively driven at constant speed and feeding its strand therepast at substantially constant speed, and the second feeding means frictionally retarding its strand so that the said strand is delivered therefrom under a substantially constant predetermined tension.*

*19. Apparatus for twisting together two strands to form a two-ply cord comprising: a source of supply of a first strand, a rotatable shaft engaging the strand and rotating it in the form of a balloon, a support carrying a let-off strand package for a second strand within the balloon, a first means for feeding the first strand axially into a shaft, then outwardly and into the end of the balloon formed by the shaft, and finally through the balloon in the direction from the shaft to the opposite end of the balloon, a second means for feeding the second strand*

*from its package toward such opposite end of the balloon whereby the two strands meet and are plied together at the opposite end of the balloon, and means beyond the opposite end of the balloon for guiding the plied cord, the first feeding means frictionally retarding its strand so that the said strand is delivered therefrom under a substantially constant predetermined tension, and the second feeding means being positively driven at constant speed and feeding its strand at substantially constant speed.*

*20. Apparatus as defined in claim 19, wherein the first feeding means comprises a strand storage and strand retarding surface on the outside of the shaft, and the first strand is guided outwardly from the shaft to the strand storage surface on the shaft, and then into the end of the balloon engaged by the shaft.*

References Cited in the file of this patent or the original patent

UNITED STATES PATENTS

| | | |
|---|---|---|
| 2,442,775 | Nelson | June 8, 1948 |
| 2,473,521 | Gwaltney | June 21, 1949 |
| 2,503,242 | Clarkson | Apr. 11, 1950 |
| 2,597,015 | May | May 20, 1952 |
| 2,676,452 | Cook | Apr. 27, 1954 |
| 2,913,867 | Schrenk | Nov. 24, 1959 |
| 2,939,267 | Klein | June 7, 1960 |

FOREIGN PATENTS

| | | |
|---|---|---|
| 521,958 | Belgium | Aug. 31, 1953 |
| 523,245 | Belgium | Oct. 31, 1953 |
| 571,112 | Germany | Feb. 23, 1933 |
| 1,008,928 | France | Feb. 27, 1952 |